UNITED STATES PATENT OFFICE.

OLIVER G. HOLT, OF LOUISVILLE, KENTUCKY.

ART OF PRINTING, &c.

SPECIFICATION forming part of Letters Patent No. 424,557, dated April 1, 1890.

Application filed December 24, 1889. Serial No. 334,829. (No specimens.)

*To all whom it may concern:*

Be it known that I, OLIVER G. HOLT, a citizen of the United States, residing at Louisville, in the county of Jefferson and State of Kentucky, have invented a new and useful Improvement in the Art of Printing, Lithographing, &c., of which the following is a specification.

My invention relates to such inks as are employed in type and plate printing, the ink being applied to the impression-surface. The ordinary printing-inks are manufactured from linseed-oil boiled down to the proper consistency, to which are added various gums, and sometimes alkalies, after which pigments are ground in to give the desired color, the compound forming a homogeneous mass.

My invention consists in printing, lithographing, &c., by means of a product technically termed "residuum," obtained from the distillation, or in some cases the distillation and filtration, of crude petroleum, being an unctuous deposit having a specific gravity varying from 15° to 20° Baumé, wholly free from grit and foreign substances. The residuum best suited to this purpose is that obtained from the crude petroleum of California, Ohio, and Kentucky, particularly the oils of the two former States; but I do not limit myself to the use of residuum from those oils. A chemical analysis, however, of the oils specially referred to reveals the fact that they contain sulphides held in solution which are not contained in some other (notably Pennsylvania) oils. To this fact may be attributed the special adaptability of the residuum from these oils to the use of a printing-ink. The viscid or adhesive property required in an oil for printing-ink may be imparted to the residuum by the addition of resin or resinous gums by fusion. The quantity of resin employed should vary according to the consistency of the residuum to which it is added. Ordinarily for "news" ink the proportion should be about twenty-five per cent. resin; for "book" or "job" ink, about forty per cent. For lithographing the proportions should be about equal. Pigments are employed and ground into the compound above described in the usual manner and in about the quantity usually employed in commercial printing-inks. If desired, the oil may be filtered before the process of distillation, or the residuum may be filtered, this process causing no essential change, except to eliminate a portion of the coloring-matter. Every desired color can be produced, the residuum assimilating pigments readily.

An ink of a beautiful olive color is produced by simply combining the resin with the residuum without filtration and without the addition of any pigment.

Extended experiments have demonstrated the fact that inks thus manufactured dry almost instantaneously when applied to paper, and are unfading when exposed to light or heat, and are almost indelible. The porous texture of paper absorbs the small percentage of light oil contained in the residuum, carrying with it a little of the coloring-matter, leaving the more solid residue on the surface of the paper, which becomes quickly dry. As is well known, residuum is produced in great quantities in this and other countries, and is sold at a very low price. Inks thus made would be cheaper than any other commercial ink, and in many respects superior in quality. These inks are adapted to the entire range of impression-work, including printing, lithographing, engraved work, &c., the only difference in preparation being in consistency rather than in ingredients, as in the case of ordinary commercial inks.

Having described my invention, what I claim, and desire to secure by Letters Patent, is—

1. The herein-described improvement in the art of printing, lithographing, and general impression-work, which consists in printing, lithographing, &c., by means of an ink of which residuum, substantially as specified—a product of petroleum—is the essential constituent.

2. The herein-described improvement in the art of printing, lithographing, and general impression-work, which consists in printing, lithographing, &c., by means of an ink composed of residuum, substantially as specified—a product of petroleum—and resin or resinous gums.

3. The herein-described improvement in the art of printing, lithographing, and general impression-work, which consists in printing, lithographing, &c., by means of an ink composed of residuum, substantially as specified—a product of petroleum—resin or resinous gums, and a pigment or pigments.

In testimony whereof I affix my signature in presence of two witnesses.

OLIVER G. HOLT.

Witnesses:
DAVID W. FAIRLEIGH,
F. P. STRAUS.